United States Patent
Moore et al.

[11] Patent Number: 6,141,892
[45] Date of Patent: Nov. 7, 2000

[54] APPARATUS FOR LIMITING CHAIN WEAR

[75] Inventors: Dennis L. Moore, Talbott; David L. King, Morristown, both of Tenn.

[73] Assignee: Jeffrey Chain, L.P., Del.

[21] Appl. No.: 09/296,162

[22] Filed: Apr. 21, 1999

[51] Int. Cl.⁷ .............................. E02F 5/06; F16G 13/06
[52] U.S. Cl. ................................. 37/352; 474/214; 59/4
[58] Field of Search .................................. 474/206, 231, 474/202, 232, 210, 214, 215, 217, 219; 37/352, 347, 355, 466; 59/4, 5

[56] References Cited

U.S. PATENT DOCUMENTS

| | | |
|---|---|---|
| Re. 28,169 | 9/1974 | Zimmer . |
| 1,665,100 | 4/1928 | Klaucke . |
| 2,424,087 | 7/1947 | Focke et al. . |
| 2,844,042 | 7/1958 | Mercier . |
| 2,994,186 | 8/1961 | Morrow . |
| 3,960,412 | 6/1976 | Shuler ........................................ 305/57 |
| 4,114,467 | 9/1978 | Petershack . |
| 4,941,315 | 7/1990 | Thuerman . |
| 4,990,124 | 2/1991 | Bartoletto et al. ...................... 474/206 |
| 5,030,175 | 7/1991 | Schwengel ............................. 474/214 |
| 5,199,197 | 4/1993 | Thuerman . |
| 5,269,729 | 12/1993 | Thuerman et al. ..................... 474/207 |
| 5,533,939 | 7/1996 | Martin et al. . |
| 5,709,075 | 1/1998 | Wu . |

*Primary Examiner*—Robert E. Pezzuto
*Attorney, Agent, or Firm*—Luedeka, Neely & Graham, P.C.

[57] ABSTRACT

An apparatus for limiting sliding wear and kick-back wear in straight sidebar chains as well as offset sidebar chains includes a wear bar which is attached to the outer surface of the chain's sidebar. The wear bar includes a main body portion having a forward wear bar end in opposed relation to a rearward wear bar end. An inner wear bar surface is positioned adjacent the outer surface of the chain's sidebar and is separated from an outer wear bar surface by a distance at least as great as the distance by which the chain's pin heads extend beyond the sidebars. In one embodiment, the upper edge of the wear bar includes a pair of semi-circular openings which fit closely adjacent the protruding pin heads. In another embodiment, the openings in the wear bar fully encircle the pin heads. A recess formed in the lower wear bar edge is used to weld the wear bar to the chain's sidebar. The lower edge of the wear bar may also be hardened to limit wear to the wear bar itself.

21 Claims, 4 Drawing Sheets

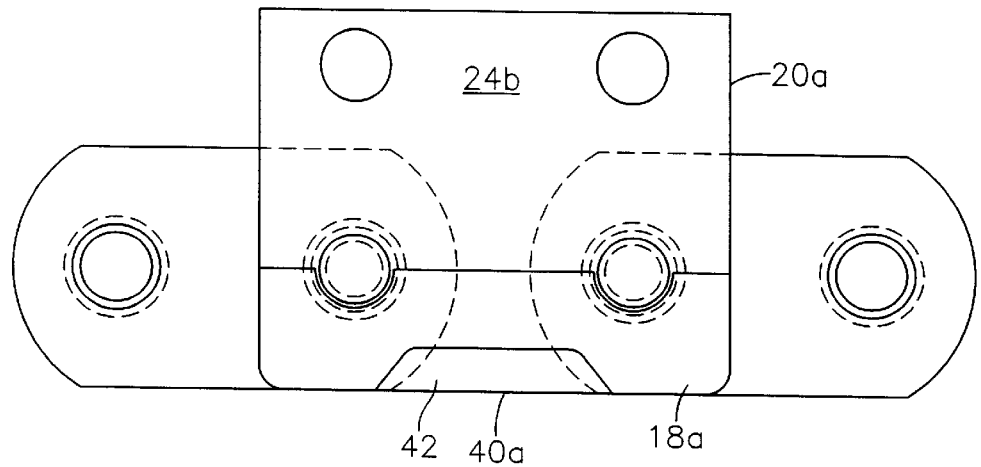
*Fig.* 2
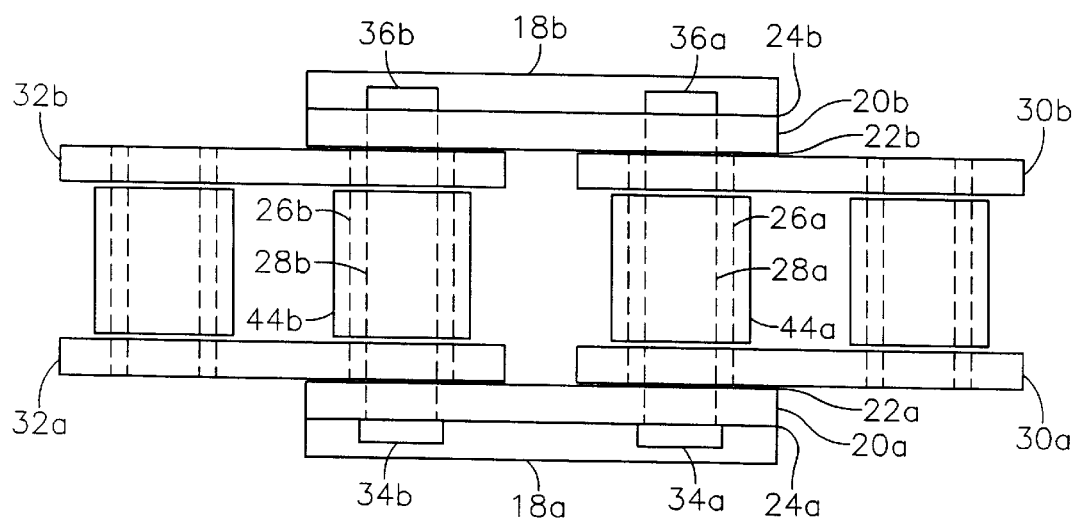
*Fig.* 3

APPARATUS FOR LIMITING CHAIN WEAR

TECHNICAL FIELD

The present invention relates to limiting wear in chains. More particularly, it relates to attaching structure to sidebars of a chain to limit wear of the chain's connector pins and sidebars.

BACKGROUND

Chains fitted with cutting or abrading attachments are typically employed in a variety of applications. For example, trenching machines (commonly referred to as "trenchers") incorporate various types of cutting attachments onto chains. The chains are typically sprocket driven and are revolved about an extended arm or boom. With the chain revolving about the boom, the boom is lowered into contact with the ground whereby the cutting attachments remove soil, rock and other spoil from the ground. A trench is formed in the ground where the chain and its cutting attachments have removed soil and other materials.

Trenching chains are subjected to tremendous abrasive forces during operation. The outer surface of the chain's sidebars and the pin heads used to interconnect the links of the chain are particularly susceptible to abrasion and wear which primarily results as the outer sidebar surface and pin head scrape against the walls of the forming trench. Wear also tends to occur to the lower edge of the sidebars as the chain travels along the boom. When cutting through particularly difficult materials such as rock, a new chain may be operated for only a few hours before a wear-related failure of the chain occurs. As can be appreciated, such wear-related failures reduce productivity and increase the cost of operating conventional trenchers.

SUMMARY

With regard to the foregoing and other objects, the invention provides an apparatus for limiting chain wear in a chain that includes a plurality of links, each of which has first and second substantially parallel spaced-apart sidebars. Each sidebar includes a forward sidebar end and a rearward sidebar end separated from each other by the length of the sidebar, an upper sidebar edge and a lower sidebar edge separated from each other by the height of the sidebar, and an outer sidebar surface and an inner sidebar surface separated from each other by the thickness of the sidebar, wherein the inner sidebar surfaces of each pair of sidebars face each other and the outer sidebar surfaces of each pair of sidebars face outwardly of the pair of sidebars.

A forward sidebar aperture is located adjacent the forward sidebar end and passes from the outer sidebar surface to the inner sidebar surface. Likewise, a rearward sidebar aperture is located adjacent the rearward sidebar end and passes from the outer sidebar surface to the inner sidebar surface. Each link of the chain further includes a forward chain pin having a pin head and a shaft, the shaft passing through the forward sidebar apertures of the first and second sidebars so that the pin head of the forward chain pin is adjacent the outer sidebar surface of the first sidebar. In like fashion, each link includes a rearward chain pin having a pin head and a shaft, the shaft passing through the rearward sidebar apertures of the first and second sidebars so that the pin head of the rearward chain pin is adjacent the outer sidebar surface of the first sidebar.

The apparatus for use with the above-described chain includes a wear bar for attachment to the outer sidebar surface of the first sidebar of at least one of the links of the chain for limiting wear to one or more chain pin heads and at least the lower sidebar edge of the first sidebar. The wear bar includes a main body portion having a forward wear bar end and a rearward wear bar end spaced from each other by the length of the wear bar, an inner wear bar surface attached to the outer sidebar surface of the first sidebar, an outer wear bar surface spaced from the inner wear bar surface by the thickness of the wear bar, an upper wear bar edge and a lower wear bar edge spaced from each other by the height of the wear bar. The lower wear bar edge is positioned closely adjacent the lower sidebar edge to limit wear to the lower sidebar edge. Preferably, the thickness of the wear bar between the inner and outer wear bar surfaces is at least about as great as the thickness of the pin heads of the forward and rearward chain pins. The wear bar further includes at least one opening dimensioned to receive at least part of one of the pin heads so that the portion of the wear bar adjacent the opening limits contact between the pin head and adjacent material being cut.

A wear bar having the above described features may be provided in a number of different embodiments. For example, in one embodiment, the wear bar includes forward and rearward openings of substantially semi-circular dimension provided in the upper wear bar edge adjacent the forward and rearward chain pins, respectively. Preferably, the radius of the openings is about, but slightly greater than the radius of the chain pin heads so the wear bar fits flush against the outer sidebar surface and the portion of the wear bar adjacent the openings is closely adjacent the pin heads. In another embodiment, the rearward wear bar edge extends rearwardly of the adjacent rearward sidebar end, and in yet another embodiment the upper sidebar edge is positioned above the location of the pin heads wherein at least one opening fully encircles an adjacent pin head.

Other features which characterize the wear bar include special hardening of the lower wear bar edge to limit wear on the wear bar itself. Additionally, the lower wear bar edge may include an elongate recess about midway along its length to facilitate attachment of the wear bar to the outer sidebar as by welding placed in the area of the sidebar exposed by the recess.

The present invention also provides a trenching machine having a trenching boom. A chain assembly of the type described above containing the wear bar is supported by the trenching boom.

In accordance with another aspect of the invention, there is provided a method for limiting wear in a chain having a plurality of links of the type described in the above apparatus. The method includes attaching a wear bar to the outer surface of at least the first sidebar to limit wear to at least one of the chain pin heads and to limit wear to the lower sidebar edge of the first sidebar. The wear bar includes a forward wear bar end and a rearward wear bar end spaced from each other by the length of the wear bar, an inner wear bar surface attached to the outer sidebar surface of the first sidebar, an outer wear bar surface spaced from the inner wear bar surface by the thickness of the wear bar, an upper wear bar edge and a lower wear bar edge spaced from each other by the height of the wear bar. The lower wear bar edge is positioned closely adjacent the lower sidebar edge to limit wear to the lower sidebar edge. Preferably, the thickness of the wear bar between the inner and outer wear bar surfaces is at least about as great as the thickness of the pin heads of the forward and rearward chain pins. The wear bar further includes at least one opening dimensioned to receive at least part of one of the pin heads so that the portion of the wear bar adjacent the opening limits contact between the pin head and adjacent material being cut.

In practicing the above described method, it is also to be noted that the wear bar may be attached to the first sidebar in the field only after the chain begins to show signs of wear.

BRIEF DESCRIPTION OF THE DRAWINGS

The above and other features, aspects and advantages of the present invention will become further understood from the following detailed description and appended claims considered in conjunction with the accompanying drawings in which:

FIG. 2 is a side view of a chain link employing a wear bar of the type shown in FIG. 1;

FIG. 3 is a top view of the chain link and wear bar of FIG. 2;

DETAILED DESCRIPTION OF A PREFERRED EMBODIMENT

Figure 1:
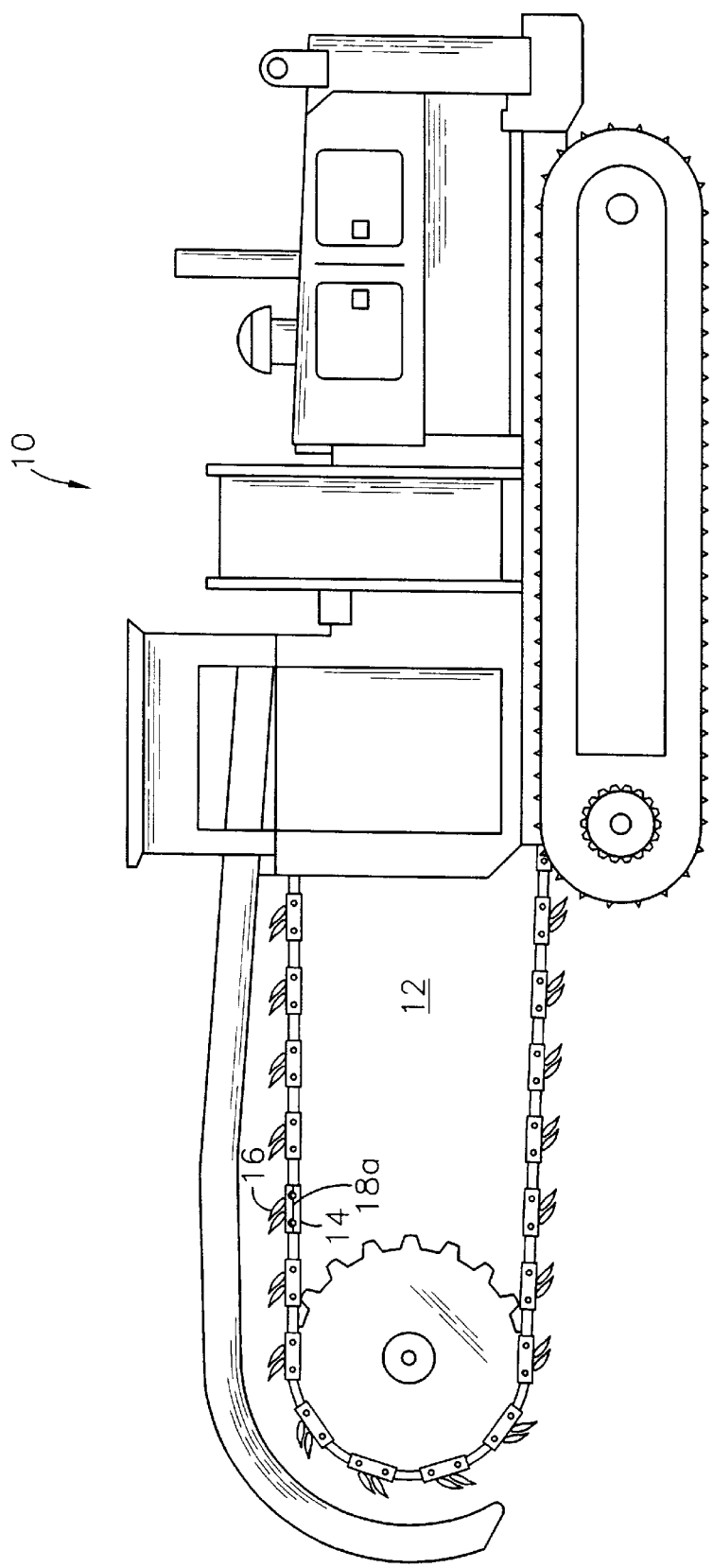
FIG. 1 is a side view of a trenching machine incorporating a wear bar on a single chain link to limit wear to the chain link in accordance with one embodiment of the present invention.

With reference now to the drawings in which like reference characters designate like or similar parts throughout the several views, FIG. 1 illustrates a trenching machine 10 having a trenching boom 12 and a chain assembly 14 supported by and revolved about the trenching boom 12. An example of such a trenching machine 10 is a T655 Commander® hydrostatic trencher manufactured by Vermeer Manufacturing Company of Pella, Iowa. In general, the trenching machine 10 creates trenches by revolving the chain assembly 14 about the boom 12 as the boom 12 is lowered into contact with the ground so that soil, rock, and other materials are removed by the chain assembly 14 to form a trench in the ground. The chain assembly 14, which may include parallel straight sidebars or parallel offset sidebars, includes cutters 16 attached to the chain links which function to cut through the soil and other materials as the chain assembly 14 is moved. Various types and configurations of cutters may be employed as dictated by the particular types of ground materials that are to be cut. For example, the chain assembly 14 shown in FIG. 1 includes cutters 16 at each outer link in the chain assembly 14. In other applications, cutters 16 may be included only for predetermined ones of the links, such as every third link of the chain assembly 14.

As shown in FIGS. 2 and 3, the links of the chain assembly 14 include a pair of outer sidebars 20a, 20b having an inner sidebar surface 22a, 22b and an outer sidebar surface 24a, 24b. Each end of the parallel sidebars 20a, 20b is connected to separate pairs of parallel inner sidebars. More specifically, the forward end of each sidebar 20a, 20b is connected to an inner sidebar 30a, 30b and the rearward end of each parallel sidebar 20a, 20b is connected to an inner sidebar 32a, 32b. An elongate tubular bushing 26a, 26b extends through apertures in the inner sidebars. An elongate flat-head solid chain pin 28a, 28b is received through the apertures in outer sidebar 20a, through the inside of bushings 26a, 26b, and through the apertures in outer sidebar 20b so that the chain pin heads 34a, 34b are adjacent the outer surface 24a of outer sidebar 20a and the pin ends 36a, 36b extend out beyond the outer surface 24b of outer sidebar 20b. The pin ends 36a, 36b are typically swaged to keep chain pins 28a, 28b in place. A roller 44a, 44b is positioned about each of the bushings 26a, 26b for engaging the teeth of sprockets which drive and/or guide the chain assembly 14. It will be understood, however, that the invention may also be used to limit wear to non-roller chains.

The chain assembly 14 typically encounters a high level of friction as the chain assembly 14 cuts through the ground. Consequently, the chain assembly 14 experiences wear as a result of prolonged cutting operations. The extent of chain wear over any given period of cutting operation will depend in large measure on the types of material being cut. For example, chain wear will be much greater when cutting through rock than when cutting through softer material. A large amount of wear occurs along the lower edges 40a of the chain's sidebars where the lower sidebar edges slide along the boom 12. Sliding wear is also typically observed at the chain pin heads 34a, 34b and chain pin ends 36a, 36b. Another form of wear commonly referred to in the art as "kick-back" wear occurs to the trailing end of the lower sidebar edges 40a when the chain assembly 14 kicks back against the boom 12 in response to a rapid onset in the resistance of the material being cut. The extent of kick-back wear can be limited by maintaining proper tension on the chain assembly 14, but some amount of kick-back wear will typically be experienced even under optimal conditions.

To limit the extent of wear to the chain assembly 14, wear bars 18a, 18b are attached to the outer surfaces 24a, 24b of the outer sidebars 20a, 20b. If desired, only one wear bar may be attached to each chain link. The wear bars 18a, 18b are uniquely configured to protect against both sliding wear to the lower sidebar edges 40a and pin heads 34a, 34b as well as kick-back wear to the trailing end of the lower sidebar edges 40a. The wear bars 18a, 18b have a thickness which is preferably at least as great as the length by which the pin heads 34a, 34b and pin ends 36a, 36b extend beyond the outer sidebars 20a, 20b. In effect, the wear bars 18a, 18b function as a wear buffer which absorbs some or all of the frictional forces that are typically imparted on the outer sidebars 20a, 20b and chain pins 28a, 28b so that wear which would otherwise be imparted on the outer sidebars 20a, 20b and chain pins 28a, 28b is imparted on the wear bars 18a, 18b. The wear bars 18a, 18b also limit wear to the outer sidebars 20a, 20b and chain pins 28a, 28b by causing dirt and other spoil to be diverted away from the outer sidebars 20a, 20b and chain pins 28a, 28b.

Figure 4:
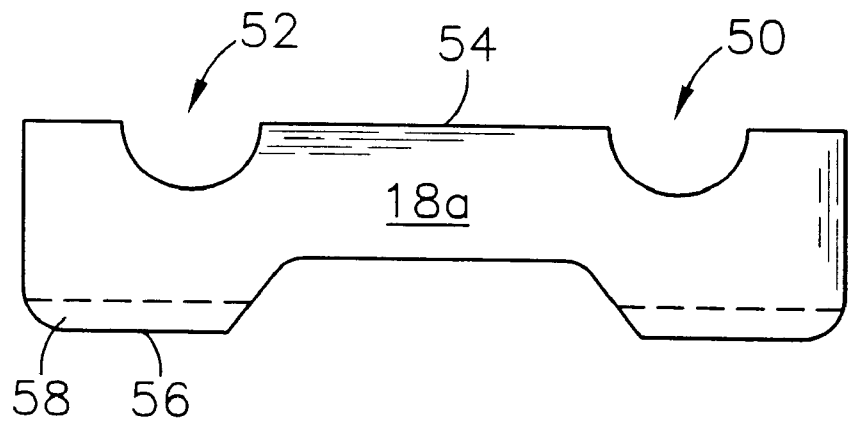
FIG. 4 is a side view of the wear bar shown in FIG. 2 with a recess on the lower edge of the wear bar to enhance attachment of the wear bar to the chain.

A preferred embodiment of a wear bar 18a is shown in FIG. 4. As can be seen, the wear bar 18a is in the form of a plate fabricated from an abrasion-resistant material, which is preferably steel with a forward opening 50 and a rearward opening 52, each of which are preferably of a substantially semi-circular dimension and formed in the upper edge 54 of the wear bar 18a. The openings 50, 52 are sized to fit around and to receive at least a portion of the pin heads 34a, 34b as shown in FIG. 2. It will be understood that the openings 50, 52 can also be square, elliptical, circular, triangular, and other shapes and may likewise be a through opening as in an aperture extending through the full thickness of the wear bar or a partial through opening as in a surface recess. Alternatively or additionally, the lower edge 56 of the wear bar 18a may be metal hardened as generally indicated by reference number 58, such as by induction hardening, heat treating, or both, to provide even greater protection against wear.

Metal hardening a portion of the lower wear bar edge 56 provides an effective method for enhancing the wear protection features of the wear bar 18a when hardening the entire wear bar 18a would be prohibitively expensive as well as superfluous since most wear will occur to the lower wear bar edge 56. Induction hardening of the lower wear bar edge 56 is preferably accomplished by heat treating the metal to a hardness of about 350 Brinell or greater.

Referring again to FIGS. 2 and 3, in a preferred embodiment the wear bars 18a, 18b are attached to the sidebars 20a, 20b by welding. The wear bars 18a, 18b are preferably welded to the sidebars 20a, 20b by forming weld lines along the outer edges of the wear bars 18a, 18b. To enhance attachment of the wear bars 18a, 18b to the sidebars 20a, 20b, a welding recess 42 may be included along the lower wear bar edge so that a weld line can be formed along the edges of the welding recess 42. Alternatively, the wear bars 18a, 18b may be attached to the outer sidebars 20a, 20b by rivets or other suitable fastener.

Figure 5:
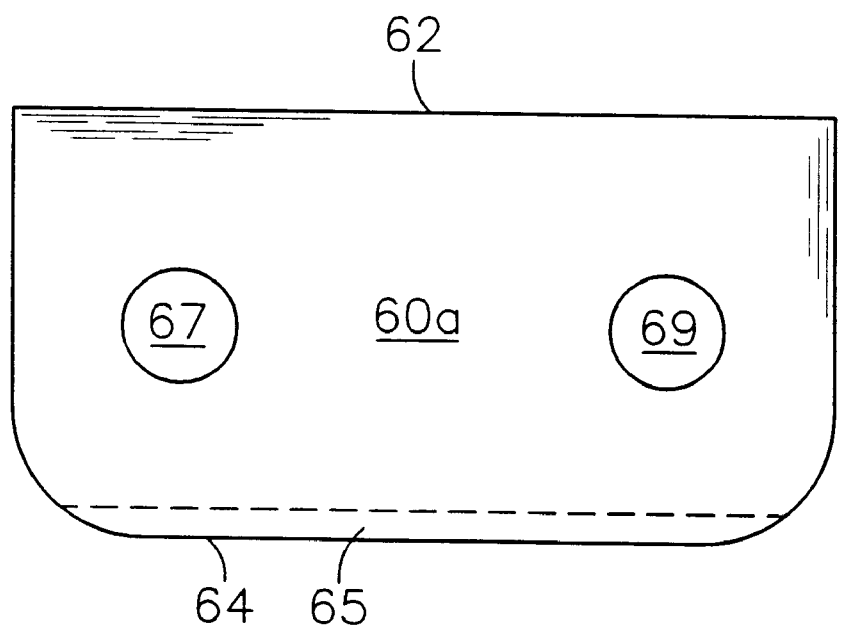
FIG. 5 is a side view of an another embodiment of a wear bar in accordance with the present invention and illustrating by dashed line a hardened portion of the lower edge.
Figure 6:
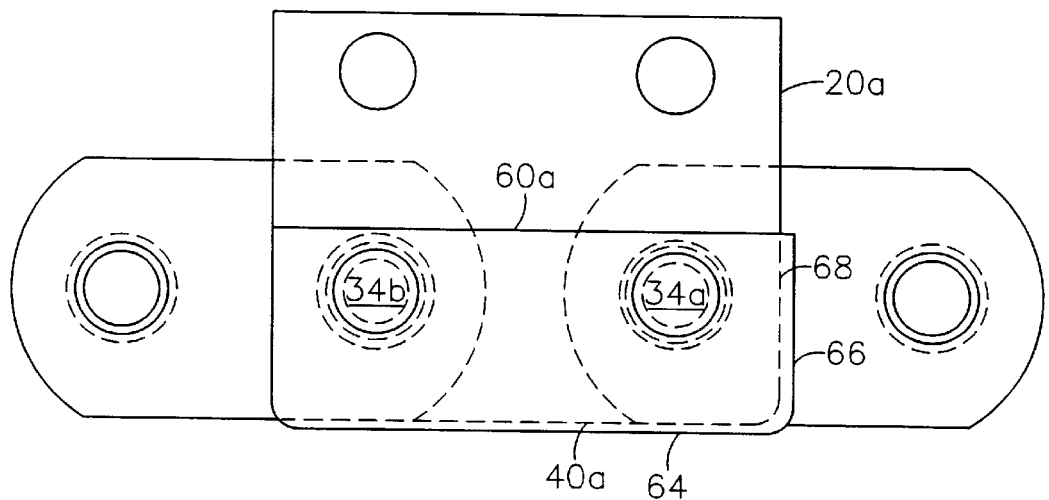
FIG. 6 is a side view of a chain link employing the wear bar of FIG. 5 with the lower and trailing wear bar edges extending beyond corresponding edges of the chain's outer sidebar.

An alternate embodiment of a wear bar 60a is shown in FIG. 5. The wear bar 60a is in the form of a plate with an upper edge 62 and a lower edge 64 which is preferably hardened for enhanced wear resistance. The wear bar 60a includes a forward aperture 67 of substantially circular dimension and a rearward aperture 69 of substantially circular dimension. The apertures 67, 69 are sized to fit around the pin heads 34a, 34b. As shown in FIG. 6, this alternate wear bar 60a is preferably attached to the outer sidebar 20a by welding, rivets, or other suitable fastener. Wear protection afforded by the wear bar 60a may be enhanced by hardening a portion (shown generally at 65) of the lower wear bar edge 64.

Figure 7:
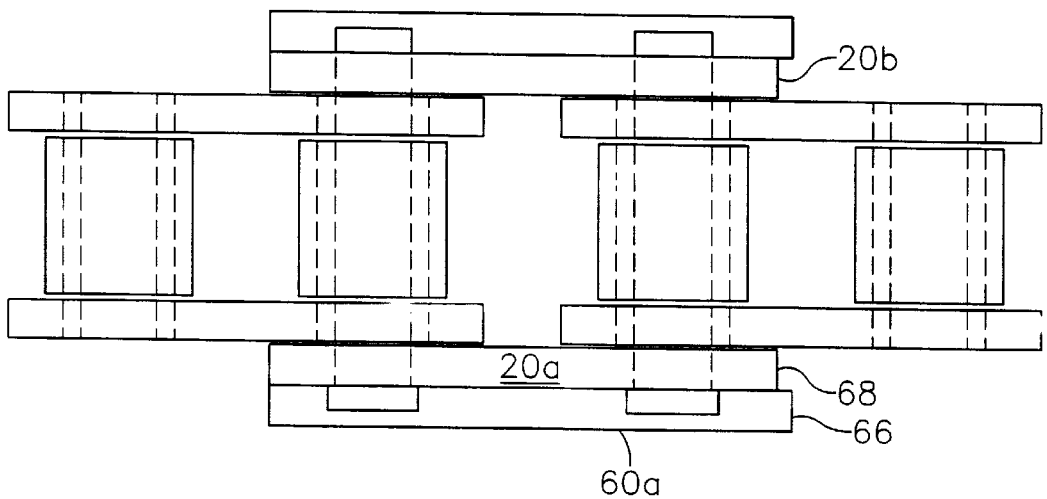
FIG. 7 is a top view of the chain link and wear bar of FIG. 6.

A wear bar according to the present invention may be attached to the chain assembly's outer sidebars in such a way that the lower edge of the wear bar is substantially flush with the lower edge of the sidebar, as shown in FIG. 2. If desired, however, the lower edge 64 of the wear bar 60a (FIG. 5) may extend beyond the lower edge 40a of the outer sidebar 20a, as shown in FIG. 6, so that as the chain assembly 14 is revolved about the boom 12 contact between the lower edge of the sidebar 20a and the boom 12 is eliminated. In many cases, extending the lower edge 64 of the wear bar 60a in this manner will further limit wear to the lower edge 40a of the outer sidebar 20a. In addition, kick-back wear to the trailing end of the lower sidebar edge 40a may be further limited by extending the trailing end 66 of the wear bar 60a beyond the trailing end 68 of the outer sidebar 20a as shown in FIGS. 6 and 7.

It will be appreciated that the present invention provides an apparatus and method for limiting both sliding wear and kick-back wear in any chain which is subject to such wear, including cutter chains. The apparatus may be incorporated into the chain assembly 14 prior to use, or the apparatus may be employed at some point when noticeable chain wear has began to occur. In this regard, the invention is highly versatile and can be employed to prolong the service life of new chains as well as chains which are near failure due to excessive wear. In either case, the present invention provides an effective means for prolonging the service life of cutter chains and significantly reduces downtime and resultant costs which must be endured when a wear-related chain failure occurs.

It is contemplated, and will be apparent to those skilled in the art from the foregoing specification, drawings, and examples that modifications and/or changes may be made in the embodiments of the invention. Accordingly, it is expressly intended that the foregoing are only illustrative of preferred embodiments and modes of operation, not limiting thereto, and that the true spirit and scope of the present invention be determined by reference to the appended claims.

What is claimed is:

1. An apparatus for limiting chain wear in a chain having a plurality of links where each link includes first and second substantially parallel spaced-apart sidebars, each sidebar having a forward sidebar end and a rearward sidebar end separated from each other by the length of the sidebar, an upper sidebar edge and a lower sidebar edge separated from each other by the height of the sidebar, an outer sidebar surface and an inner sidebar surface separated from each other by the thickness of the sidebar, wherein the inner sidebar surfaces of each pair of sidebars face each other and the outer sidebar surfaces of each pair of sidebars face outwardly of the pair of sidebars, a forward sidebar aperture located adjacent the forward sidebar end and passing from the outer sidebar surface to the inner sidebar surface and a rearward sidebar aperture adjacent the rearward sidebar end and passing from the outer sidebar surface to the inner sidebar surface, each link of said chain further including a forward chain pin having a pin head and a shaft passing through the forward sidebar apertures of the first and second sidebars so that the pin head of the forward chain is adjacent the outer sidebar surface of the first sidebar, said chain further including a rearward chain pin having a pin head and a shaft passing through the rearward sidebar apertures of the first and second sidebars so that the pin head of the rearward chain pin is adjacent the outer sidebar surface of the first sidebar, the apparatus comprising:

a wear bar for attachment to the outer sidebar surface of the first sidebar of at least one of the links of the chain for limiting wear to one or more chain pin heads and at least the lower sidebar edge of the first sidebar, said wear bar including a main body portion having:
a forward wear bar end;
a rearward wear bar end spaced from the forward wear bar end by the length of the wear bar;
an inner wear bar surface for placement adjacent the outer sidebar surface of the first sidebar;
an outer wear bar surface spaced from the inner wear bar surface by the thickness of the wear bar;
an upper wear bar edge;
a lower wear bar edge spaced from the upper wear bar edge by the height of the wear bar and positioned closely adjacent the lower sidebar edge to limit wear to the lower sidebar edge; and
at least one opening dimensioned to receive at least part of one of the pin heads so that the portion of the wear bar adjacent the opening limits contact between the pin head and adjacent material being cut;
wherein the thickness of the wear bar between the inner and outer wear bar surfaces is at least as great as the thickness of the pin heads of the forward and rearward chain pins.

2. The apparatus of claim 1, further including:
a forward opening of substantially semi-circular dimension provided in the upper wear bar edge adjacent the forward chain pin; and
a rearward opening of substantially semi-circular dimension provided in the upper wear bar edge adjacent the rearward chain pin.

3. The apparatus of claim 2 wherein the radius of said forward and rearward openings is about, but slightly greater than, the radius of the chain pin heads so that the wear bar fits flush against the outer sidebar surface and the portion of the wear bar adjacent the openings is closely adjacent the pin heads.

4. The apparatus of claim 1 wherein the rearward wear bar edge extends rearwardly of the rearward sidebar end.

5. The apparatus of claim 1 wherein the upper sidebar edge is positioned above the location of the pin heads and the at least one opening fully encircles an adjacent pin head.

6. The apparatus of claim 1 wherein said lower wear bar edge extends beyond said lower sidebar edge to further limit wear to the lower sidebar edge.

7. The apparatus of claim 1 wherein said lower wear bar edge includes a hardened metal portion to limit wear to the wear bar itself.

8. The apparatus of claim 1 wherein said lower wear bar edge includes an elongate recess about midway along its length to facilitate attachment of the wear bar to the outer sidebar as by welding placed in the area of the sidebar exposed by the recess.

9. The apparatus of claim 1, further comprising a second wear bar for attachment to the outer sidebar surface of the second sidebar of said at least one of the links of the chain for limiting wear to one or more chain pin ends and at least the lower sidebar edge of the second sidebar.

10. A trenching machine comprising:
a trenching boom; and
a chain assembly supported by said trenching boom, said chain assembly comprising:
 a plurality of links where each link includes first and second substantially parallel spaced-apart sidebars, each sidebar having a forward sidebar end and a rearward sidebar end separated from each other by the length of the sidebar, an upper sidebar edge and a lower sidebar edge separated from each other by the height of the sidebar, an outer sidebar surface and an inner sidebar surface separated from each other by the thickness of the sidebar, wherein the inner sidebar surfaces of each pair of sidebars face each other and the outer sidebar surfaces of each pair of sidebars face outwardly of the pair of sidebars, a forward sidebar aperture located adjacent the forward sidebar end and passing from the outer sidebar surface to the inner sidebar surface and a rearward sidebar aperture adjacent the rearward sidebar end and passing from the outer sidebar surface to the inner sidebar surface, each link of said chain further including a forward chain pin having a pin head and a shaft passing through the forward sidebar apertures of the first and second sidebars so that the pin head of the forward chain is adjacent the outer sidebar surface of the first sidebar, said chain further including a rearward chain pin having a pin head and a shaft passing through the rearward sidebar apertures of the first and second sidebars so that the pin head of the rearward chain pin is adjacent the outer sidebar surface of the first sidebar, the apparatus comprising:
  a wear bar for attachment to the outer sidebar surface of the first sidebar of at least one of the links of the chain for limiting wear to one or more chain pin heads and at least the lower sidebar edge of the first sidebar, said wear bar including a main body portion having:
   a forward wear bar end;
   a rearward wear bar end spaced from the forward wear bar end by the length of the wear bar;
   an inner wear bar surface for placement adjacent the outer sidebar surface of the first sidebar;
   an outer wear bar surface spaced from the inner wear bar surface by the thickness of the wear bar;
   an upper wear bar edge;
   a lower wear bar edge spaced from the upper wear bar edge by the height of the wear bar and positioned closely adjacent the lower sidebar edge to limit wear to the lower sidebar edge; and
   at least one opening dimensioned to receive at least part of one of the pin heads so that the portion of the wear bar adjacent the opening limits contact between the pin head and adjacent material being cut;
  wherein the thickness of the wear bar between the inner and outer wear bar surfaces is at least as great as the thickness of the pin heads of the forward and rearward chain pins.

11. The apparatus of claim 10, further including:
a forward opening of substantially semi-circular dimension provided in the upper wear bar edge adjacent the forward chain pin; and
a rearward opening of substantially semi-circular dimension provided in the upper wear bar edge adjacent the rearward chain pin.

12. The apparatus of claim 11 wherein the radius of said forward and rearward openings is about, but slightly greater than, the radius of the chain pin heads so that the wear bar fits flush against the outer sidebar surface and the portion of the wear bar adjacent the openings is closely adjacent the pin heads.

13. The apparatus of claim 10 wherein the rearward wear bar edge extends rearwardly of the rearward sidebar end.

14. The apparatus of claim 10 wherein the upper sidebar edge is positioned above the location of the pin heads and the at least one opening fully encircles an adjacent pin head.

15. A method for limiting wear in a chain having a plurality of links where each link includes first and second substantially parallel spaced-apart sidebars, each sidebar having a forward sidebar end and a rearward sidebar end separated from each other by the length of the sidebar, an upper sidebar edge and a lower sidebar edge separated from each other by the height of the sidebar, an outer sidebar surface and an inner sidebar surface separated from each other by the thickness of the sidebar, wherein the inner sidebar surfaces of each pair of sidebars face each other and the outer sidebar surfaces of each pair of sidebars face outwardly of the pair of sidebars, a forward sidebar aperture located adjacent the forward sidebar end and passing from the outer sidebar surface to the inner sidebar surface and a rearward sidebar aperture adjacent the rearward sidebar end and passing from the outer sidebar surface to the inner sidebar surface, each link of said chain further including a forward chain pin having a pin head and a shaft passing through the forward sidebar apertures of the first and second sidebars so that the pin head of the forward chain is adjacent the outer sidebar surface of the first sidebar, said chain further including a rearward chain pin having a pin head and a shaft passing through the rearward sidebar apertures of the first and second sidebars so that the pin head of the rearward chain pin is adjacent the outer sidebar surface of the first sidebar, the method comprising:
attaching a wear bar to the outer surface of the first sidebar to limit wear to the forward and rearward chain pin heads and to limit wear to the lower sidebar edge of the first sidebar, said wear bar having a forward wear bar end and a rearward wear bar end spaced from the forward wear bar end by the length of the wear bar, an inner wear bar surface adjacent the outer sidebar surface of the first sidebar, an outer wear bar surface spaced from the inner wear bar surface by the thickness of the wear bar, wherein the thickness of the wear bar between the inner and outer wear bar surfaces is at least as great as the thickness of the pin heads of the forward and rearward chain pins, an upper wear bar edge, a lower wear bar edge spaced from the upper wear bar edge by the height of the wear bar and positioned closely adjacent the lower sidebar edge to limit wear to the lower sidebar edge, and at least one opening dimensioned to receive at least part of one of the pin heads so that the portion of the wear bar adjacent the opening limits contact between the pin head and adjacent material being cut.

16. The method of claim 15, further comprising attaching the wear bar to the first sidebar only after the chain begins to show signs of wear.

17. The method of claim 15, further comprising extending the lower wear bar edge beyond the lower sidebar edge to further limit wear to the lower sidebar edge.

18. The method of claim 15, further comprising hardening the lower wear bar edge to limit wear to the wear bar itself.

19. An apparatus for limiting chain wear in a chain having a plurality of links where each link includes first and second substantially parallel spaced-apart sidebars, each sidebar having a forward sidebar end and a rearward sidebar end separated from each other by the length of the sidebar, an upper sidebar edge and a lower sidebar edge separated from each other by the height of the sidebar, an outer sidebar surface and an inner sidebar surface separated from each other by the thickness of the sidebar, wherein the inner sidebar surfaces of each pair of sidebars face each other and the outer sidebar surfaces of each pair of sidebars face outwardly of the pair of sidebars, a forward sidebar aperture located adjacent the forward sidebar end and passing from the outer sidebar surface to the inner sidebar surface and a rearward sidebar aperture adjacent the rearward sidebar end and passing from the outer sidebar surface to the inner sidebar surface, each link of said chain further including a forward chain pin having a pin head and a shaft passing through the forward sidebar apertures of the first and second sidebars so that the pin head of the forward chain is adjacent the outer sidebar surface of the first sidebar, said chain further including a rearward chain pin having a pin head and a shaft passing through the rearward sidebar apertures of the first and second sidebars so that the pin head of the rearward chain pin is adjacent the outer sidebar surface of the first sidebar, the apparatus comprising:

a wear bar for attachment to the outer sidebar surface of the first sidebar of at least one of the links of the chain for limiting wear to one or more chain pin heads and at least the lower sidebar edge of the first sidebar, said wear bar including a main body portion having:

a forward wear bar end;

a rearward wear bar end spaced from the forward wear bar end by the length of the wear bar;

an inner wear bar surface for placement adjacent the outer sidebar surface of the first sidebar;

an outer wear bar surface spaced from the inner wear bar surface by the thickness of the wear bar;

an upper wear bar edge;

a lower wear bar edge spaced from the upper wear bar edge by the height of the wear bar and positioned closely adjacent the lower sidebar edge to limit wear to the lower sidebar edge;

at least one opening dimensioned to receive at least part of one of the pin heads so that the portion of the wear bar adjacent the opening limits contact between the pin head and adjacent material being cut;

wherein the thickness of the wear bar between the inner and outer wear bar surfaces is at least as great as the thickness of the pin heads of the forward and rearward chain pins; and means attaching the wear bar to the first sidebar.

20. The apparatus of claim 19 wherein said means attaching includes a weld between the portion of the wear bar adjacent said opening and the outer sidebar surface.

21. The apparatus of claim 19 wherein said lower wear bar edge includes an elongate recess about midway along its length to facilitate attachment of the wear bar to the outer sidebar as by welding placed in the area of the sidebar exposed by the recess.

\* \* \* \* \*